United States Patent [19]

Schultz

[11] 4,024,982
[45] May 24, 1977

[54] PRESSURE COOKER

[75] Inventor: Horst Schultz, Frankfurt am Main, Germany

[73] Assignee: AMC International Alfa Metalcraft Corporation AG, Rotkreuz, Switzerland

[22] Filed: Aug. 2, 1976

[21] Appl. No.: 710,392

[30] Foreign Application Priority Data

Aug. 4, 1975 Germany .......................... 2534709

[52] U.S. Cl. .......................... 220/293; 292/256.6; 220/316; 220/319
[51] Int. Cl.² .................. B65D 41/06; B65D 45/00; B65D 45/32; E05B 15/02
[58] Field of Search .......... 220/293, 316, 319, 329, 220/320; 292/256.6

[56] References Cited

UNITED STATES PATENTS 3,458,083   7/1969   Erwin, Jr. .......................... 220/316
3,605,337   9/1971   Rodgers .......................... 220/316

Primary Examiner—William Price
Assistant Examiner—Steven M. Pollard
Attorney, Agent, or Firm—Kurt Kelman

[57] ABSTRACT

A pressure cooker has a pan with a circumferential rim and a lid with a closure part rotatable concentrically thereto for locking the lid on the pan part in a pressure tight manner. The lid and closure part have peripheral flanges each engaging under the edge of the pan part over a maximum of half the length thereof. The flanges are movable into one another and are arranged so that the pan rim can be released from the flanges at least over half its circumference.

10 Claims, 11 Drawing Figures

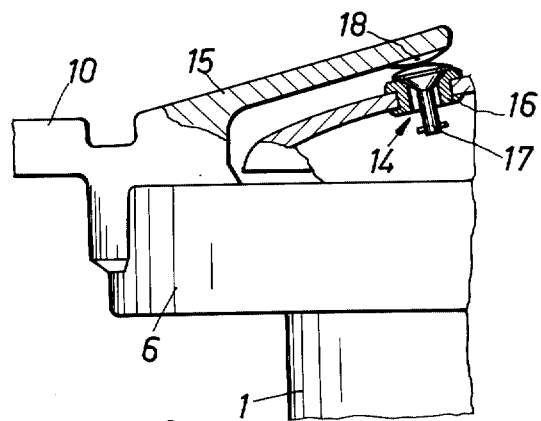
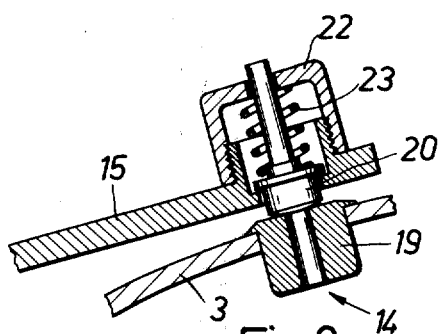
Fig. 8    Fig. 9
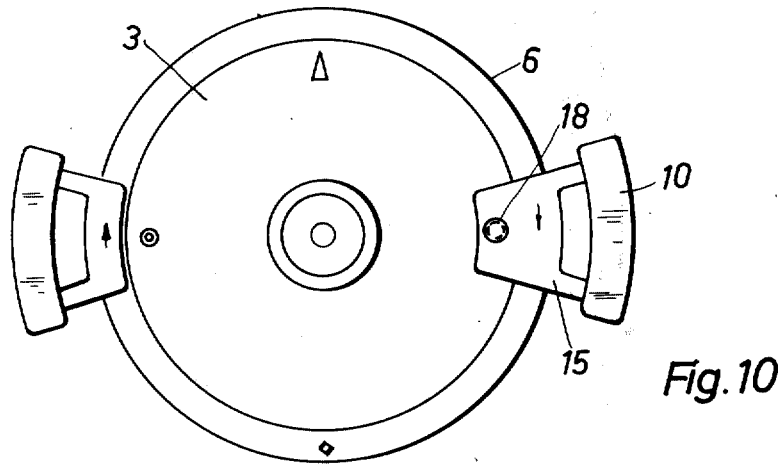
Fig. 10
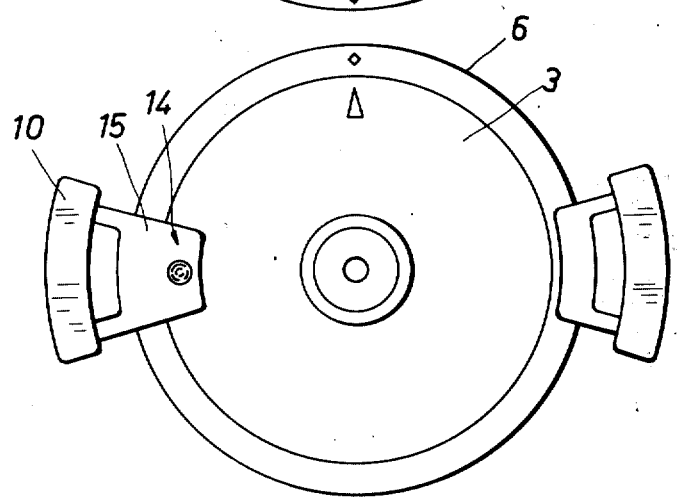
Fig. 11

PRESSURE COOKER

The invention relates to a pressure cooker consisting of a pan part and a lid which can be sealed therewith in pressure tight manner.

Pressure cookers of this kind are used for cooking food under high pressure in a relatively short cooking time.

Pressure cookers of this kind conventionally used hitherto have locking members for the pan and lid in the manner of a slide lock to obtain a hermetic seal. However, a locking mechanism of this kind can still be opened even if an overpressure has already formed in the pan or if the pressure in the pan has not yet been totally released after the cooking process. Accidental or careless undoing of the closure before the pressure has equalized is dangerous to the user since, in this case, the lid is violently removed even when there is a small overpressure.

Therefore, there are numerous rules for the construction of pressure cookers, according to which they have to be provided with an additional safety device which prevents the lid from opening when there is still some internal pressure. These safety devices consist, inter alia, of movable cams, which raise the seal of the pan upwards or force them out of their normal position in such a way that a gap is produced through which the vapor pressure is released. In its position of engagement, the cam acts as a blocking member between pan and lid in such a way that the lid can be rotated relative to the pan only when the blocking device is actuated and thus the pressure in the pan is released.

The disadvantage of the various embodiments of pressure cookers using this locking principle, however, consists in the fact that a plurality of movable individual parts is required which have to be moved by means of bell crank levers or eccentrics or connecting rods. As a result, these pressure cookers are complicated and prone to breakdown.

Consequently, the operational safety of such pressure cookers after a lengthy period of use is very low. If the complicated safety devices are damaged, the user is frequently not aware of the danger because the desired overpressure is indeed attained but there is no protection against mishandling.

Moreover, a disadvantage of a minor nature in the pressure cookers used hitherto is the fact that recesses are required on the edge of the pan for the slide-type locking mechanism with the pan and, therefore, the pan is not suitably shaped as an attractive serving dish for the table.

The invention is based on the problem of eliminating these disadvantages and, using simple means, ensuring that a pressure cooker is safeguarded from danger by premature opening before the pressure has been totally released, even after a fairly long period of use. Moreover, a buildup of pressure with an inadequately secured lid should also be prevented from occurring. Finally, the lid should be capable of being placed on a pan with a plain circumferential rim so that, when the cooker is used for serving at the table, it does not look like a commercial cooking utensil.

This problem is solved, according to the invention, with a pressure cooker of the type mentioned hereinbefore, in that the pan part is provided with a plain outwardly bent circumferential rim and the lid is provided with a closure portion rotatable concentrically thereto, the lid and closure portion comprising, on the periphery, flanges each engaging under the edge of the pan, to a maximum of half the length thereof, these flanges being movable into one another and arranged so that the rim of the pan can be released from the flanges over at least half its periphery.

To place the lid on the pan, namely by laterally sliding the lid unit onto the pan part, the lid and closure portion are rotated relative to one another in such a way that the above mentioned half segments with their flanged engagement cover one another and thus the lid unit can be slid onto the pan from the side.

For easier handling, two handles are mounted on the closure ring in such a way that, when the lid unit has been put on, they exactly cover the handles of the pan. In this first closure position, the lid unit is prevented from lifting from the pan. If the cooking process is begun in this position, no overpressure or only a very small overpressure can build up in the pan, since there is no flange over half the circumference and the vapor pressure raises the lid on one side, so that the vapor forming can escape continuously. Thus, with the lid in this position, it is impossible for a higher pressure to be maintained or built up in the pan.

In order to close the pan completely, it is necessary to rotate the closure ring through 180° relative to the lid. This is carried out by lightly pressing the lid over the sealing ring against the edge of the pan, whereby the closure ring can easily be moved rotationally on the sliding ring. The pan is not entirely closed until after the closure ring has been rotated through 180°, i.e. when the handles of the closure ring are again exactly over the handles of the pan. The two positions are made clearly distinguishable from one another by means of suitable symbols on the lid and closure ring.

On opening the pan, the pressure in the pan is first released as usual (by sudden cooling or by carefully actuating a discharge valve). It should be virtually impossible to rotate the closure ring when under pressure. If this is achieved, however, the pressure existing is released, as the angle of rotation of the closure part is increased, through a gap thus formed.

After complete rotation through 180°, the pressure has decreased to a harmlessly small value; however, the lid is still prevented from rising. The lid is only entirely removed by laterally sliding it off the pan, analogously to the manner in which it was slid on.

The pressure cooker according to the invention thus requires only a plain circumferential radially outwardly bent rim on its pan part, for locking purposes. Therefore, the pan part cannot be recognised by its design as a constituent of a pressure cooker so that these pans are also suitable as serving dishes. Moreover, the pressure cooker according to the invention is intrinsically safe from opening under pressure; in contrast to known pressure cookers, it is impossible for the safety device to become defective whilst the functioning of the cooker is unaffected. This is exceptionally important in the prevention of accidents.

As a further improvement, in the lid part of the cooker is provided a valve which is closed by means of an element correspondingly offset on the closure ring, only when the closure ring is in its end position, i.e. total closure of the cooker. In this way, additional safety for the user is guaranteed in case he wrongly leaves the closure ring in an intermediate position between the first closure position and the fully closed position. In this case, pressure may develop by means of which the sealing ring is forced out of its position and a gap is produced through which vapor flows out of the cooker and endangers the user.

Other features, advantages and possible applications of the invention are given in the following description of embodiments by way of example, referring to the drawing wherein.

Figure 5:
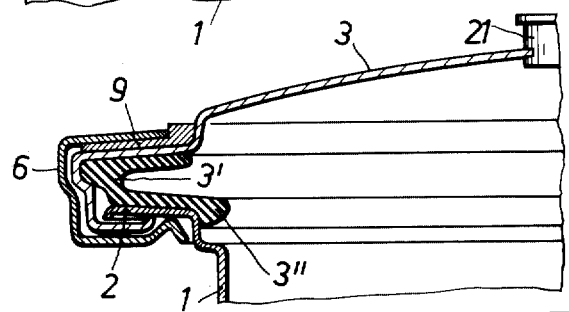
Figure 6:
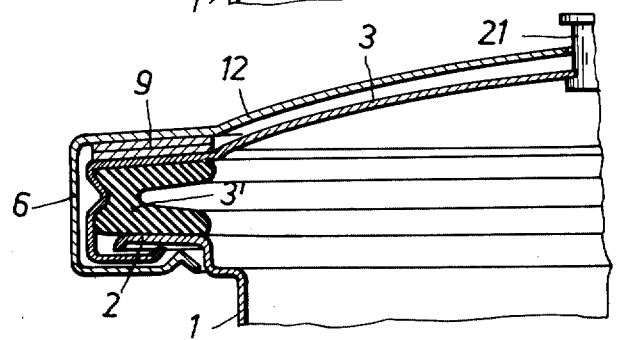
Figure 7:
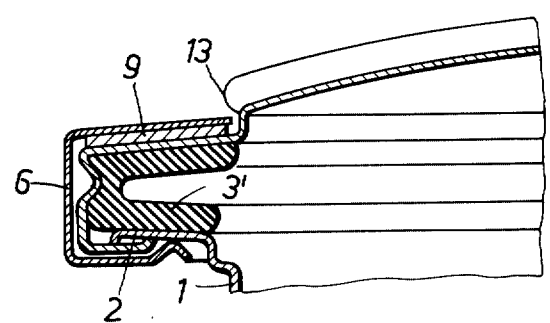

FIGS. 5 to 7 diagrammatically show various other embodiments of the lid unit and sealing ring;

FIG. 8 shows a particular embodiment of the lid;

FIG. 9 shows a construction of the lid modified from the embodiment according to FIG. 8;

FIG. 10 shows the cooker viewed from above in the first closure position; and

FIG. 11 shows the cooker viewed from above with the closure portion in the end position.

In the figures, corresponding parts are given corresponding reference numerals.

Figure 1:
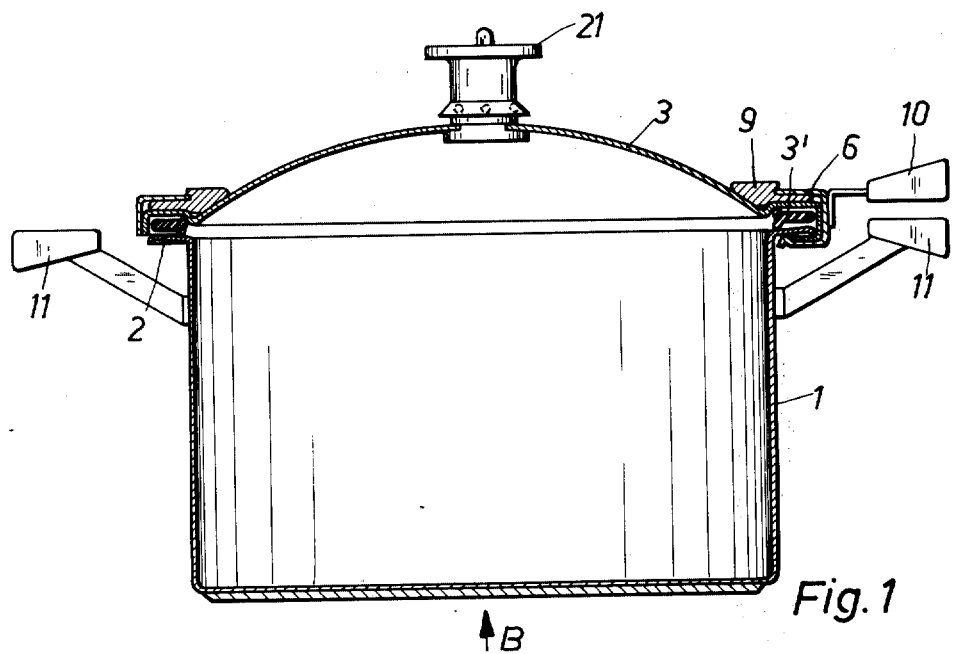
FIG. 1 shows in cross section the pressure cooker according to the invention with its lid placed on it.

As shown in FIG. 1, the pressure cooker consists of pan part 1, lid 3 and closure part 6 which is constructed as a ring in this case. Rotating sealing ring 3' made of rubber or another heat resistant elastic material is mounted between the lid unit consisting of lid 3 and closure part 6 and pan rim 2 of pan part 1.

In the center of lid 3 is located an overpressure valve 21 which is adjustable in its minimum pressure of response.

Between closure part 6 constructed as a closure ring and lid 3, in this embodiment, there is a rotating sliding ring 9 made of plastic, preferably polytetrafluoroethylene, which facilitates relative rotation between closure part 6 and lid 3. Opposite one another on closure part 6 are mounted two handles 10 in such a way that, when the pressure cooker is closed, they are located exactly above handles 11 mounted on pan part 1.

Figure 3:
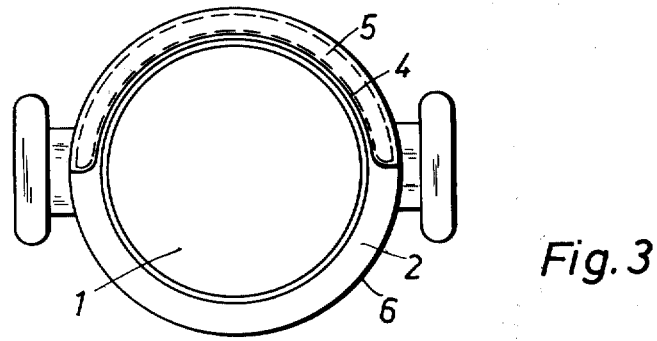
FIG. 3 shows a view in the direction of the arrow B according to FIG. 1 in the open position.
Figure 4:
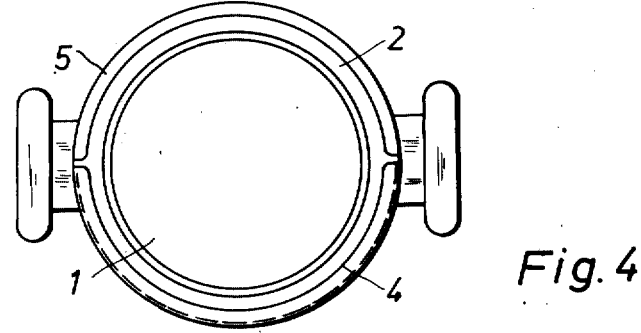
FIG. 4 shows the same view of the cooker in the closed position.
Figure 2:
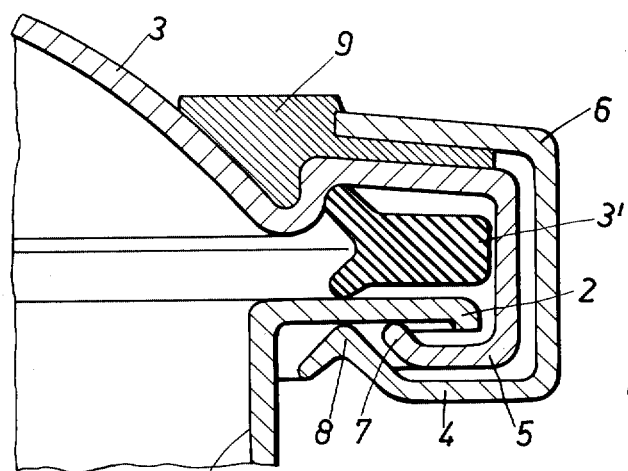
FIG. 2 shows a partial section through the pan part and the lid in the region of attachment.

The lid 3 and closure part 6 each have, on half their periphery, as clearly shown in FIGS. 3 and 4, a flange 4, 5 engaging under the pan rim 2 (see FIG. 2). Both the flange 5 of lid 3 and the flange 4 of closure part 6 each have end edges 7, 8 bent up towards the underside of pan rim 2, these edges 7, 8 both abutting on the underside of pan rim 2. Thus, the entire flange 5 of lid 2 is completely embraced by closure part 6 which is more or less U-shaped in cross section. Therefore, to open the pressure cooker, closure part 6 can be slid, by being rotated through 180° relative to the lid 3 from the "closed position" or "cooking position" according to FIG. 3, completely over flange 5 of lid 3, so that the lid can then be laterally - in FIG. 3 upwardly - slid off from pan edge 2.

On the other hand, in the "closed position" according to FIG. 4, pan rim 2 is gripped over its entire circumference both by flange 5 of lid 3 and also by flange 4 of closure part 6.

The variations in the construction of lid 2, sealing ring 3' and closure part 6, shown in FIGS. 5 to 7, are substantially equivalent. The approximately V-shaped sealing ring 3' according to FIG. 5 has on its inside a rotating thickened edge 3'', which makes it easier to slide lid 3 and closure part 6 laterally onto pan rim 2. In the embodiment of FIG. 6, closure part 6 is itself constructed to some extent as a lid 12, whereas according to FIG. 7 the lid is so distinct that a guide 13 for closure part 6 is produced.

According to FIG. 8, an opening 14 which can be closed in the manner of a valve and has a valve seating 16 and a valve cone 17 is provided eccentrically in lid 3.

A closure member 15 with a closure cam 18 is mounted on closure part 6 or on one of the handles 10.

The valve seating 16 preferably consists of an elastic material. As long as closure part 6 is not pivoted into the end closure position, opening 14 or valve cone 17 remains open and no pressure can build up in the cooker, thus giving additional safety. Not until the end closure position is reached is valve cone 17 pressed against valve seating 16 by cam 18 and thus opening 14 closed so that the desired cooking pressure can build up.

The embodiment according to FIG. 9 works on the same principle. In this case, a closure head 20 loaded with a spring 23 is located in a housing 22 on closure member 15, and this closure head 20 slides up onto valve seating 19 and closes it when the end closure position is reached. This valve may advantageously serve at the same time as a safety valve for the entire cooker, so that the overpressure valve 21 otherwise required can be dispensed with.

FIG. 10 shows the cooker viewed from above, whilst the closure element with closure member 15 has not yet been rotated into the end closure position and lid 3 has only been laterally slid onto pan rim 2.

What is claimed is:

1. Pressure cooker consisting of a pan part and a lid which can be locked thereto in pressure tight manner, the pan part having a plain circumferential outwardly bent rim and the lid being provided with a closure part rotatable concentrically thereto, the lid and closure part having on their periphery flanges each engaging under the pan edge over a maximum of half the length thereof, these flanges being constructed so as to be movable into one another and arranged so that the pan rim can be released from the flanges at least over half its circumference.

2. Pressure cooker according to claim 1, wherein the flanges are U-shaped in cross section, the flange of the closure part embracing the flange of the lid and the two flanges each having an end edge bent upwardly toward the underside of the pan rim, these end edges both abutting on the underside of the pan rim.

3. Pressure cooker according to claim 1, wherein the closure part is constructed as a closure ring.

4. Pressure cooker according to claim 1, wherein the closure part is also constructed as a lid rotatable concentrically to the lid.

5. Pressure cooker according to claim 1, wherein between the lid and the closure part is mounted a sliding ring made of plastic.

6. Pressure cooker according to claim 1, wherein on opposite sides of the closure part are mounted two handles which, in the closed position of the lid, are located directly above handles mounted on the pan part.

7. Pressure cooker according to claim 1, wherein the lid is provided with a guide for the closure part 8. Pressure cooker according to claim 1, wherein an opening closable in the manner of a valve is mounted eccentrically in the lid, and on the closure part rotatable relative to the lid is mounted a closure member for the opening which can be placed over the opening when the closure position of the cooker is attained.

9. Pressure cooker according to claim 8, wherein the opening is constructed as a valve seating for a valve cone and a closure cam is mounted on the closure member.

10. Pressure cooker according to claim 8, wherein the opening is constructed as a valve seating for a closure head mounted in spring-loaded manner on the closure member.

* * * * *